US008335066B2

(12) United States Patent
Tang

(10) Patent No.: US 8,335,066 B2
(45) Date of Patent: Dec. 18, 2012

(54) PROTECTION CIRCUIT AND ELECTRONIC DEVICE USING THE SAME

(75) Inventor: Xing-Hua Tang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 106 days.

(21) Appl. No.: 12/893,005

(22) Filed: Sep. 29, 2010

(65) Prior Publication Data

US 2012/0002335 A1 Jan. 5, 2012

(30) Foreign Application Priority Data

Jul. 1, 2010 (CN) .......................... 2010 1 0214972

(51) Int. Cl.
*H02H 3/22* (2006.01)
(52) U.S. Cl. ........................................................ 361/111
(58) Field of Classification Search .................... 361/111
See application file for complete search history.

(56) References Cited

U.S. PATENT DOCUMENTS

| | | | | |
|---|---|---|---|---|
| 4,560,918 A * | 12/1985 | Callen | ........................... | 323/273 |
| 5,410,441 A * | 4/1995 | Allman | ........................... | 361/18 |
| 5,585,991 A * | 12/1996 | Williams | ........................ | 361/30 |
| 6,031,702 A * | 2/2000 | Williams | ........................ | 361/87 |
| 6,212,226 B1 * | 4/2001 | Newton | ........................ | 375/222 |
| 6,348,784 B1 * | 2/2002 | Gofman et al. | ................. | 323/289 |
| 6,636,409 B2 * | 10/2003 | Kladar et al. | ................. | 361/127 |
| 6,879,809 B1 * | 4/2005 | Vega et al. | .................... | 455/41.1 |
| 7,924,540 B2 * | 4/2011 | Tamegai | ...................... | 361/91.5 |
| 2004/0095702 A1 * | 5/2004 | Ghahary | ....................... | 361/118 |
| 2006/0067021 A1 * | 3/2006 | Li et al. | ........................... | 361/30 |
| 2006/0186948 A1 * | 8/2006 | Kelly et al. | ................... | 327/536 |
| 2009/0289501 A1 * | 11/2009 | Garb | ............................... | 307/39 |

* cited by examiner

*Primary Examiner* — Ronald W Leja
(74) *Attorney, Agent, or Firm* — Altis Law Group, Inc.

(57) ABSTRACT

A protection circuit is connected between an interface circuit and a main circuit of an electronic device. The interface circuit is for providing a path for a power supply to power the main circuit. The protection circuit includes an electrostatic protection unit and a mis-connect protection unit. The electrostatic protection unit is electrically connected to the interface circuit and the main circuit and is configured for clamping a voltage of a node to a predetermined value, which the node is defined by the interface circuit, the electrostatic protection unit, and the main circuit. The mis-connect protection unit is electrically connected between the node and the main circuit. When the interface circuit is incorrectly connected to the power supply, the mis-connect protection unit disconnects an electrical connection between the power supply and the main circuit.

14 Claims, 2 Drawing Sheets

PROTECTION CIRCUIT AND ELECTRONIC DEVICE USING THE SAME

BACKGROUND

1. Technical Field

The present disclosure relates to electronic devices, and particularly to an electronic device using a protection circuit for preventing the electronic device from being damaged by electrostatic discharge (ESD).

2. Description of Related Art

Main circuits used in electronic devices can be permanently damaged when subjected to high voltages generated by electrostatic discharge (ESD). Taking a portable DVD player as an example, a main circuit mounted in the DVD player is connected to a power interface for receiving power from an external alternating current (AC) adapter or a battery. Generally, the power interface includes some conductive pins for contacting the AC adapter or the battery. The conductive pins are exposed for conveniently connecting them to the AC adapter or the battery. However, the exposed conductive pins are prone to being accidentally touched by users, and static electricity accumulated on the user may discharge to the pins and damage the main circuit.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiment of an electronic device with a protection circuit. Moreover, in the drawings, like reference numerals designate corresponding parts throughout the views.

DETAILED DESCRIPTION

Embodiments of the present disclosure will now be described in detail with reference to the drawings.

Figure 1:
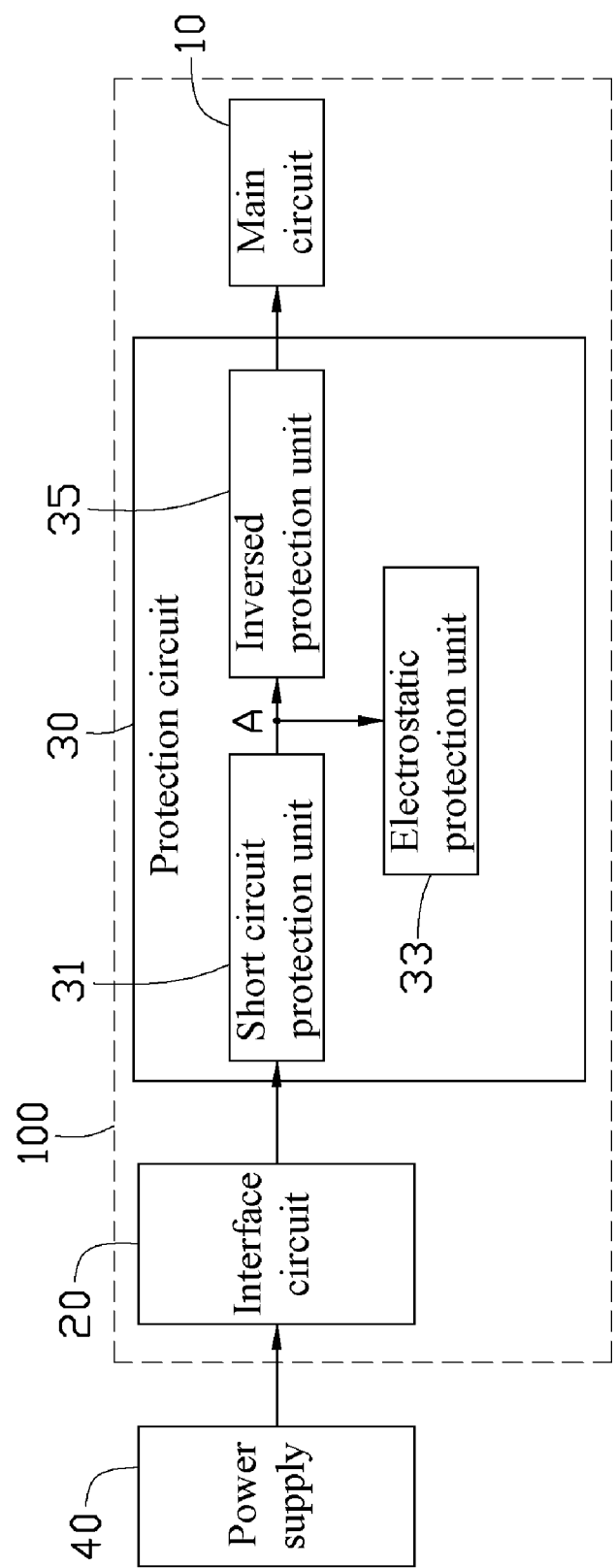
FIG. 1 is a functional block diagram of an electronic device including a protection circuit according to an exemplary embodiment.

Referring to FIG. 1, an electronic device 100 according to an exemplary embodiment is illustrated. In this embodiment, the electronic device 100 is a DVD player. The electronic device 100 is powered by a power supply 40. The electronic device 100 includes a main circuit 10, an interface circuit 20, and a protection circuit 30. The protection circuit 30 is connected between the interface circuit 20 and the main circuit 10 for protecting the main circuit 10 from being damaged by electrostatic discharge (ESD). The main circuit 10 can be a load, such as an Integrated circuit (IC).

Figure 2:
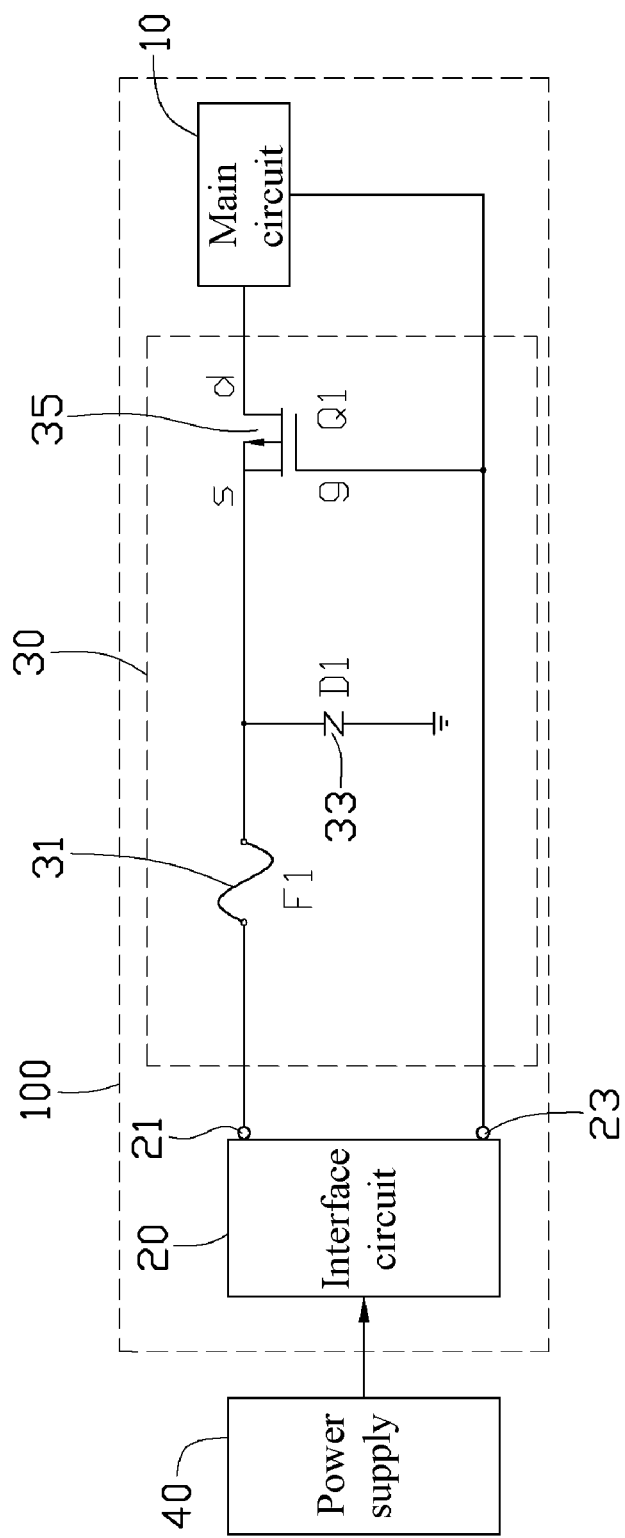
FIG. 2 is a detailed circuit diagram of the protection circuit of FIG. 1.

Further referring to FIG. 2, the interface circuit 20 includes a first input port 21 used for electrically connecting to an anode (not shown) of the power supply 40, and a second input port 23 used for electrically connecting to a cathode (not shown) of the power supply 40.

The protection circuit 30 includes a short circuit protection unit 31, an electrostatic protection unit 33, and a mis-connect protection unit 35. One end of the short circuit protection unit 31 is electrically connected to the first input port 21. The other end of the short circuit protection unit 31 is electrically connected to one end of the mis-connect protection unit 35. The other end of the mis-connect protection unit 35 is electrically connected to the main circuit 10. The electrostatic protection unit 33 is electrically connected to the short circuit protection unit 31 and the mis-connect protection unit 35 to define a node A (see FIG. 1).

The short circuit protection unit 31 is used for disconnecting an electrical connection between the first input port 21 and the main circuit 10 when the electronic device 100 is short circuited. For example, when an accidental low-resistance connection (i.e., short circuit) results in excessive amount of electric current being drawn, the short circuit protection unit 31 protects the main circuit 10 by disconnecting the main circuit 10 from the power supply 40. The short circuit protection unit 31 can be a circuit breaker. When the current flowing through the main circuit 10 is too great, the circuit breaker opens. When the current flowing through the main circuit 10 returns to a safe level, the circuit breaker resets.

The electrostatic protection unit 33 is used for clamping a voltage of the node A at a predetermined value, so as to protect the main circuit 10 from the damage caused by ESD. Generally, during an ESD process, a high voltage (e.g., 10 KV) is generated momentarily. The electrostatic protection unit 33 clamps the voltage of the node A at the predetermined value when the high voltage is applied to the power supply 40. The predetermined value is set to be lower than a threshold value above which damage the main circuit 10 is likely to occur. In this embodiment, the electrostatic protection unit 33 is a voltage dependent resistor. One end of the electrostatic protection unit 33 is electrically connected to the node A, the other end of the electrostatic protection unit 33 is electrically grounded. When the current flowing through the node A is too great, the resistance of the voltage dependent resistor becomes low to guide part of the current to ground. When the current flowing through the node A is safe, resistance of the voltage dependent resistor becomes high blocking the path to ground.

The mis-connect protection unit 35 is used for disconnecting an electrical connection between the power supply 40 and the main circuit 10 when the interface circuit 20 inversely connects to the power supply 40. For example, generally, the first input port 21 is electrically connected to the anode of the power supply 40, and the second input port 23 is electrically connected to the cathode of the power supply 40. However, if a user incorrectly connects the interface circuit 20 to the power supply 40, such as, connecting the first input port 21 to the cathode of the power supply 40, and the second input port 23 to the anode of the power supply 40, the mis-connect protection unit 35 will disconnect the main circuit 10 from the power supply 40. That is, the mis-connect protection unit 35 protects the main circuit 10 from damage.

In this embodiment, the mis-connect protection unit 35 is a P type channel MOS transistor Q1. The MOS transistor Q1 includes a gate g, a drain d, and a source s. The source s of the MOS transistor Q1 is electrically connected to the node A. The gate g of the MOS transistor Q1 is electrically connected to the second input port 23. The drain d of the MOS transistor Q1 is electrically connected to the main circuit 10. When the interface circuit 20 is correctly connected to the power supply 40, a source-gate voltage of the MOS transistor Q1 is able to exceed a threshold voltage of the MOS transistor Q1, and the MOS transistor Q1 can be turned on to provide a path for the power supply 40 to power the main circuit 10. When the interface circuit 20 is incorrectly connected to the power supply 40, the source-gate voltage of the MOS transistor Q1 keeps below the threshold voltage of the MOS transistor Q1, and the MOS transistor Q1 is always turned off to prevent the power supply 40 powering the main circuit 10. Thus, the main circuit 10 is protected from damage due to incorrectly connection between the power supply 40 and the interface circuit 20.

As discussed above, the electronic device 100 has multiple forms of protection for the main circuit 10 by the short circuit protection unit 31, the electrostatic protection unit 33, and the mis-connect protection unit 35.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation to encompass all such modifications and similar arrangements.

What is claimed is:

1. A protection circuit connected between an interface circuit and a main circuit of an electronic device, the interface circuit for providing a path for a power supply to power the main circuit, the protection circuit comprising:
    an electrostatic protection unit electrically connected to the interface circuit and the main circuit, the electrostatic protection unit configured for clamping a voltage of a node to a predetermined value, which the node is defined by the interface circuit, the electrostatic protection unit, and the main circuit; and
    a mis-connect protection unit electrically connected between the node and the main circuit, when the interface circuit is incorrectly connected to the power supply, the mis-connect protection unit disconnects an electrical connection between the power supply and the main circuit;
    wherein the electrostatic protection unit comprises a voltage dependent resistor, one end of the voltage dependent resistor is electrically connected to the node, the other end of the voltage dependent resistor is always electrically grounded.

2. The protection circuit of claim 1, wherein the mis-connect protection unit comprises a P type channel MOS transistor comprising:
    a gate electrically connected to the interface circuit;
    a source electrically connected to the interface circuit via the node; and
    a drain electrically connected to the main circuit.

3. The protection circuit of claim 1, further comprising a short circuit protection unit electrically connected between the interface circuit and the node, when the electronic device is short circuited, the short circuit protection unit is configured for disconnecting an electrical connection between the interface circuit and the main circuit.

4. The protection circuit of claim 3, wherein the short circuit protection unit comprises a circuit breaker.

5. The protection circuit of claim 3, wherein the mis-connect protection unit comprises a P type channel MOS transistor comprising:
    a gate electrically connected to the interface circuit;
    a source electrically connected to the interface circuit via the node; and
    a drain electrically connected to the main circuit.

6. An electronic device, comprising:
    a main circuit;
    an interface circuit for providing a path for a power supply to power the main circuit; and
    a protection circuit electrically connected between the interface circuit and the main circuit, the protection circuit comprising:
        an electrostatic protection unit electrically connected to the interface circuit, the electrostatic protection unit configured for clamping a voltage of a node to a predetermined value, which the node is defined by the electrostatic protection unit, the interface circuit, and the main circuit; and
        a mis-connect protection unit electrically connected between the node and the main circuit, when the interface circuit inversely connects to the power supply, the mis-connect protection unit disconnects an electrical connection between the power supply and the main circuit;
    wherein the electrostatic protection unit comprises a voltage dependent resistor, one end of the voltage dependent resistor is electrically connected to the node, the other end of the voltage dependent resistor is always electrically grounded.

7. The electronic device of claim 6, wherein the interface circuit comprises a first input port used for electrically connecting to an anode of the power supply, and a second input port used for electrically connecting to a cathode of the power supply.

8. The electronic device of claim 7, wherein the mis-connect protection unit comprises a P type channel MOS transistor comprising:
    a gate electrically connected to the first input port of the interface circuit;
    a source electrically connected to the second input port of the interface circuit via the node; and
    a drain electrically connected to the main circuit.

9. The electronic device of claim 7, further comprising a short circuit protection unit electrically connected between the interface circuit and the node, when the electronic device is short circuit, the short circuit protection unit disconnects an electrical connection between the interface circuit and the main circuit.

10. The electronic device of claim 9, wherein the short circuit protection unit comprises a circuit breaker.

11. The electronic device of claim 9, wherein the mis-connect protection unit comprises a P type channel MOS transistor comprising:
    a gate electrically connected to the first input port of the interface circuit;
    a source directly and electrically connected to the second input port of the interface circuit via the node; and
    a drain electrically connected to the main circuit.

12. An electronic device, comprising:
    a main circuit;
    an interface circuit comprising a first input port and a second input port; and
    a protection circuit electrically connected between the interface circuit and the main circuit, the protection circuit comprising:
        an electrostatic protection unit electrically connected to the first input port of the interface circuit; and
        a P type channel MOS transistor configured to disconnect an electrical connection between the power supply and the main circuit when the interface circuit inversely connects to the power supply, the P type channel MOS transistor comprising:
            a gate electrically connected to the first input port of the interface circuit;
            a source electrically connected to the second input port of the interface circuit; and
            a drain electrically connected to the main circuit;
    wherein the electrostatic protection unit comprises a voltage dependent resistor, one end of the voltage dependent resistor is electrically connected to the first input port, the other end of the voltage dependent resistor is always electrically grounded.

13. The electronic device of claim 12, further comprising a short circuit protection unit, one end of the short circuit protection unit electrically connected to the first input port, the other end of the short circuit protection unit electrically connected to the electrostatic protection unit and the P type channel MOS transistor to define a node.

14. The electronic device of claim 13, wherein the short circuit protection unit comprises a circuit breaker.

* * * * *